United States Patent
Newhouse (10) Patent No.: US 9,904,719 B2
(45) Date of Patent: Feb. 27, 2018

(54) PROPAGATING COMPUTABLE DEPENDENCIES WITHIN SYNCHRONIZED CONTENT ITEMS BETWEEN FIRST AND THIRD-PARTY APPLICATIONS

(71) Applicant: Dropbox, Inc., San Francisco, CA (US)

(72) Inventor: Benjamin Zeis Newhouse, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/986,060

(22) Filed: Dec. 31, 2015

(65) Prior Publication Data
US 2017/0193069 A1 Jul. 6, 2017

(51) Int. Cl.
*G06F 17/30* (2006.01)
*G06F 17/22* (2006.01)

(52) U.S. Cl.
CPC .... *G06F 17/30575* (2013.01); *G06F 17/2247* (2013.01); *G06F 17/30371* (2013.01)

(58) Field of Classification Search
CPC .. G06F 17/215; G06F 17/2247; G06F 17/276; G06F 17/30371; G06F 17/30575
USPC ........................................ 707/634, 651, 694
See application file for complete search history.

(56) References Cited

U.S. PATENT DOCUMENTS

| | | | | | |
|---|---|---|---|---|---|
| 5,469,538 | A * | 11/1995 | Razdow | ................. | G06F 17/10 345/440 |
| 2006/0074726 | A1* | 4/2006 | Forbes | ............... | G06Q 10/0637 705/7.36 |
| 2006/0129929 | A1* | 6/2006 | Weber | .................. | G06F 17/276 715/267 |
| 2011/0252304 | A1* | 10/2011 | Lemonik | ............. | G06F 17/3089 715/234 |
| 2013/0205195 | A1* | 8/2013 | Dekhil | ................... | G06Q 10/10 715/234 |
| 2014/0188544 | A1* | 7/2014 | Senescu | ............. | G06Q 10/0633 705/7.27 |

OTHER PUBLICATIONS

"Create an External Reference (Link) to a Cell Range in Another Workbook," Microsoft, 2016, 4 pages, [Online] [Retrieved on Mar. 9, 2015] Retrieved from the Internet<URL: https://support.office.com/en-us/article/Create-an-external-reference-link-to-a-cell-range-in-another-workbook-c98d1803-dd75-4668-ac6a-d7cca2a9b95f>.

* cited by examiner

*Primary Examiner* — Marc Filipczyk
(74) *Attorney, Agent, or Firm* — Fenwick & West LLP (57) ABSTRACT

A content management system synchronizes content items across client computing systems connected by a network. The content management system provides a first party web application to the user. The first party application receives input from the user to create a dependency on another piece of information on a content item in the content management system. The input from the user contains a formula defining the relations between the information source and the created dependency. The value of the dependency is then dependent on the information in the referenced content item and changes based on updates to that content item. The user may also create dependencies with synchronized third party content items.

20 Claims, 8 Drawing Sheets

Dependency Graph 126

| | Object ID | Object Name | Formula | Dependencies | Dependents |
|---|---|---|---|---|---|
| 400 → | 1 | incomeTotal | 2-(3+4) | 2, 3, 4 | N/A |
| 410 → | 2 | sales | 10000 | N/A | 1 |
| 420 → | 3 | refunds | 2500 | N/A | 1 |
| 430 → | 4 | opExpenses | 5500 | N/A | 1 |
| 440 → | 5 | promoParagraph | xxxxx xxxxx xxxxxx xxxxxxxx xxx xxxxxx xxxxx xxxxx xxxxx xxxx xxxxxxxxx xxxx xxxxx xxxxxxx xxxxx xxxxxxxx xxxxxxxx xxxxxxx xxxxx xxxxxxxxx xx xxxxxx xx xxxxxx xxx xxxx xxxxx xxxx xxxxxxx xxxxxx xx xxxxxxx xxxxx xxxxxxxxxx xxxx xxx xxx | N/A | N/A |

Third Party Graph 132

| | File Path | Cell Location | Dependent Object ID |
|---|---|---|---|
| 450 → | Finances.xlsx | G3 | 2 |
| 460 → | Finances.xlsx | G9 | 3 |
| 470 → | Finances.xlsx | G14 | 4 |

Dependency Graph 126

| Object ID | Object Name | Formula | Dependencies | Dependents |
|---|---|---|---|---|
| 1 | incomeTotal | 2-(3+4) | 2, 3, 4 | N/A |
| 2 | sales | 10000 | N/A | 1 |
| 3 | refunds | 2500 | N/A | 1 |
| 4 | opExpenses | 5500 | N/A | 1 |
| 5 | promoParagraph | xxxxx xxxxx xxxxxx xxxxxxx xxx xxxxxxx xxxxxx xxxxxx xxxxx xxxxx xxxxxxxxx xxxxxxx xxxxx xxxxxxxxx xx xxxxx xx xxxxxxx xxx xxxx xxxxxx xx xxxxxxx xxxx xxxxx xxxxxxxxx xxxxx xxx xxx | N/A | N/A |

400 → Object ID
410 → 1
420 → 2 (row marker)
430 → 3-4 (row markers)
440 → 5

Third Party Graph 132

| File Path | Cell Location | Dependent Object ID |
|---|---|---|
| Finances.xlsx | G3 | 2 |
| Finances.xlsx | G9 | 3 |
| Finances.xlsx | G14 | 4 |

PROPAGATING COMPUTABLE DEPENDENCIES WITHIN SYNCHRONIZED CONTENT ITEMS BETWEEN FIRST AND THIRD-PARTY APPLICATIONS

BACKGROUND

The described embodiments relate generally to improving workflow dynamics by providing synchronized and updated information across content items and applications.

Content management systems enable users to share content items from one client to another client. The clients are computing devices that provide content items to a content management system for storage and synchronization with other clients. Content management systems typically store content items for a variety of computer applications including, for example, word processing applications, spreadsheet applications, and presentation applications. Oftentimes a user of a content management system wishes to update a number of documents in the content management system with a new or updated piece of information. For example, if a user who works at a company intends to give a monthly presentation to the board of the company, the user may wish to update the presentation each month with the latest sales numbers from the last month. However, the process of updating documents is usually tedious, involving many application accesses and copy and paste actions by a user. In the above example, even though both documents might be synchronized on a content management system, the user would typically have to copy and paste the latest numbers from a spreadsheet, or other such document, to the presentation before showing it to the board. In another example, a user might want to use a default paragraph across a variety of promotional materials and so would have to copy and paste the paragraph to each document. As illustrated by the above examples, propagating information across documents of different applications and in different locations can be a time consuming process for users.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Functional Overview of a Dependency System for a Content Management System

A general functional overview of a content item synchronization system and process is now described. As a preliminary condition, users store content items on client devices, and the content items are synchronized with instances of the content items on other clients and with a host system, typically a content management system. A client device stores the content items in a local content directory. Content items stored in the local content directory are synchronized with a content management system, which maintains copies of the content items and synchronizes the content items with other client devices. Each client device executes a client application, which enables the user to access the content management system. The content items in the content management system may be any type of content items that would be stored on a computer including text files, audio files, image and video files, presentation files, spreadsheet files etc.

A user of the content management can create dependencies between documents using first party and/or third party applications while editing content items synchronized on the content management system. A dependency may simply be a link propagating information saved on one content item to a specific location in another content item. Alternatively, a dependency may apply a calculation or other function or transformation on the linked information. In some cases, these calculations may involve a plurality of linked values originally located in a plurality of different content items. Additionally, other static values may be added to the dependency calculation at the user's discretion. These types of dependencies are referred to as 'reference dependencies" herein. A dependency may also be a mutual dependency between two or more synchronized content items. In this case, a change to dependent content in one content item will be reflected in another content item or vice versa. These dependencies are referred to as "alias dependencies" herein.

Dependencies may be created by the user in a variety of ways. In some embodiments, a dependency may be created by typing an instance of a specific symbol, for example an "=" followed by text defining the dependency. Additionally, a user might name a dependency by typing text followed immediately by the symbol followed by the definition of the dependency. Various other syntax structures may differentiate reference dependencies from alias dependencies. Dependencies may also be created by the user via a prompt by a first party application or an add-on to a third party application associated with the content management system. The user interface prompt may appear upon receiving an input from the user to paste information from another content item synchronized with the content management system. The prompt may offer a number of options to the user including options to create a reference dependency, create an alias dependency, or to paste without a dependency. Depending on the option selected by the user, the appropriate dependency will be created. A user may create a dependency with information from content items of a third party application using specific syntax in a first party application or while using an add-on in a third party application. A first party application or an add-on to a third party application may also provide a user interface for creating dependencies with other documents.

Once a user has created a dependency, the dependency is maintained in a dependency graph for access by client applications of the content management system and first party applications of the content management system. The content management system supplements the dependency graph using a third party dependency graph for each supported third party application. A corresponding live fill module gathers necessary data from synchronized content items on the content management system and updates the dependency graph accordingly. Any first party or supported third party applications may then access the dependency graph to determine the value of each dependency in the currently open content item.

Overview of System Architecture

Figure 1:
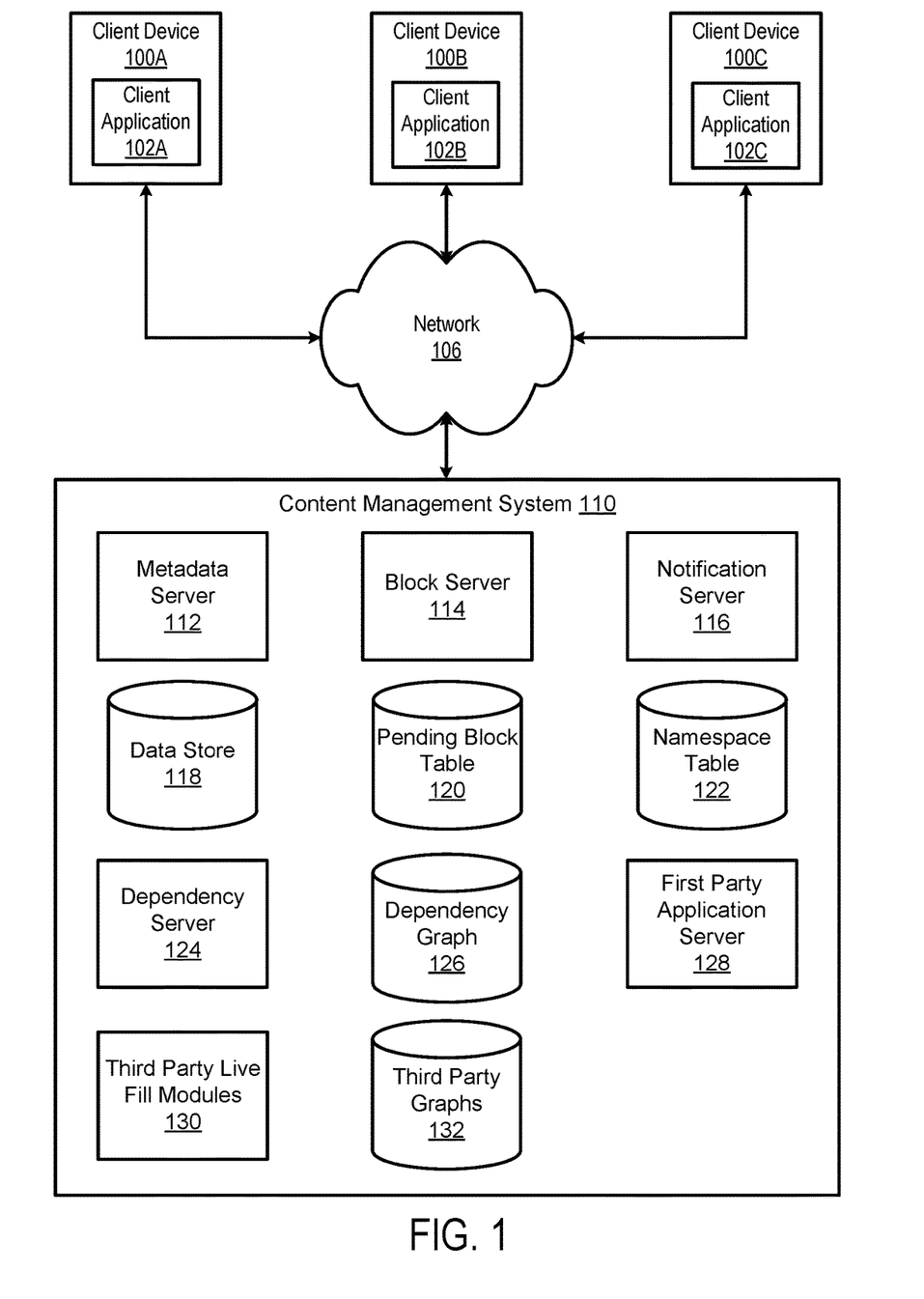
FIG. 1 illustrates a system environment for a content management system that synchronizes content items between client devices and the content management system in accordance with one embodiment.

FIG. 1 illustrates the system architecture of a content management system. Details about each component will be further described in a later section, however some elements are introduced here to provide context for the explanation of dependency propagation in a synchronized content management system. Further, as is apparent to those of skill in the art, the operations and methods used for dependency propagation in a synchronized content management system necessarily require a computer, and are not performed in any embodiment by mental steps by a human operator. Further, while the operations may make use of the facilitates of a computer to store and retrieve information, transmit and send information, or process information, those of skill in the art appreciate that such operations are not simply generic computer operations since they are herein performed in specific manners on specifically defined data using the algorithms described herein, and thus require configuration of a computer in a manner different from how such computers are provisioned natively by their operating system and standard applications alone. Additionally, the configuration disclosed provides enhanced data linking capabilities for applications opening content items on a content management system.

Client devices 100 communicate with content management system 110 through a network 106 which can be any suitable communication means providing internetworking between client devices 100 located remotely from content management system 110. In general, client device 100A with a client application 102A installed provides content items to content management system 110. The client application 102A contains the programs and protocols necessary for client device 100A to perform the functions associated with dependency propagation. Therefore, client device 100A often performs actions requested by the client application 102A. However because client device 100A and client application 102A act together, for ease of description some of these actions are referred to using "client device 100A" as the operative element. The user of client device 100A has designated certain of the content items to be shared with client device 100B, which for example, can be another computer managed by the same user, or a computer operated by a different user. Content management system 110 notifies client device 100B and synchronizes the designated content items received from client device 100A with local content stored at client device 100B. The content management system is typically responsible for notifying client devices that they require synchronization.

Content management system 110 associates each content item with a namespace corresponding to a set of content items. A namespace designates a directory (or "folder") in a directory structure into which the given content items are stored. The association of content items with particular namespaces is stored in a namespace table 122. Content management system 110 associates each client with the namespaces (and content items therein) to which it has access, along with an identification of the specific rights to access, modify, and delete the content items in each namespace. When clients 100 are synchronized to a namespace, the clients store a local copy of content items associated with the namespace and organize the content items according to content location, if available. A user may be associated with an individual client device 100 or with multiple clients 100; for example, a user may have a home computer, a work computer, a portable computer, a smartphone, and tablet computer all synchronized together. To share content items, a user designates a namespace to be shared with other users and/or clients. Content management system 110 then synchronizes the content items in the shared namespace(s) across the clients 100 associated with the shared namespace. The content items stored at content management system 110 can include any type of content item, including documents, data, movies, applications, code, images, music, and so forth. The content item may also be a folder or other mechanism of grouping content items together, such as a collection, playlist, album, file archive, and so forth.

Each user is associated with an account on content management system 110 that includes information specifying an amount of storage to be used for storing content items on content management system 110.

Overview of Content Management System

The method of synchronization using content management system 110 between client devices 100A and 100B can be explained with reference to the architecture illustrated by FIG. 1. The following describes one of a number of possible methods of synchronization that may be used with dependency propagation in the content management system 110.

Content management system 110 stores content items in data store 118. Content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at content management system 110. The metadata includes a blocklist that defines the blocks in the content item and an ordering of the blocks in the content item.

Pending block table 120 maintains a list of pending blocks expected to be received at content management system 110. Pending block table 120 stores an association between blocks (identified by block identifiers) and the namespaces to which the blocks belong that clients 100 indicate will be transmitted.

Namespace table 122 stores data associating individual content items with namespaces and maintains data associating each namespace with clients.

Metadata server 112 is responsible for managing a request from the client to add ("commit") a new content item to content management system 110. Metadata server 112 also receives requests to synchronize content items from client device 100. Metadata server 112 maintains a record of the last time that client device 100 synchronized with content management system 110. When a request is received from client device 100 to synchronize, metadata server 112 determines any content items that have been committed to namespaces synchronized to that client device 100 since the last synchronization time stamp. In addition, metadata server 112 determines any pending blocks that have been received since the last synchronization time stamp.

Notification server 116 is responsible for communicating with clients 100, and particularly with notifying clients that new data is available. The notification server 116 maintains a list of clients 110 associated with each namespace at namespace table 122. When the notification server 116 receives an alert from block server 114 or metadata server 112 that a new block is available for a given namespace, notification server 116 identifies clients associated with the namespace from namespace table 112. Notification server 116 notifies client(s) 100 associated with the namespace to wake client(s) 100 and indicates that new blocks are available for the identified namespace.

Synchronization between two clients 100, client device 100A and client device 100B occurs as follows. First, client device 100A adds an additional content item to the shared data. The additional content item is then transmitted to content management system 110. Content management system 110 notifies client device 100B that the additional content item is in the shared data, and client device 100B retrieves the additional content item from content management system 110 as client device 100B. Content management system 110 maintains a list of content items and pending blocks that are expected to be received at content management system 110 using a pending block table 120, and notifies client device 100B to download blocks corresponding to a content item as blocks are received by content management system 110. Pending blocks are those blocks that correspond to a content item that content management system 110 expects to receive and are used to identify blocks that may be provided to receiving client device 100B prior to a content item being committed to content management system 110.

To manage in-transit content items, content management system 110 retains a list of pending blocks along with the namespace associated with the pending blocks. When a pending block is received, clients associated with the namespace are notified and can initiate a transfer for the received block. Thus, uploading clients (providing a new content item) and downloading clients (receiving the new content item) may asynchronously transfer blocks to content management system 110.

In addition to the servers and databases responsible for synchronization the client device also includes a dependency server 124, a dependency graph 126, a first party application server 128, third party live fill modules 130, and third party graphs 132.

The first party application server 128 provides web applications to users of the content management system 110. These web applications may include word processing applications, spreadsheet applications, presentation applications, or any other type of application. In some embodiments, the first party application provides a hybrid application that can be used for word processing and may contain previews of content items on the content management system 110. The first party application server 128 provides a web application interface to the user through the user's web browser. Using the provided web application, the user may create a first party content item, which is stored in the data store 118. However, unlike the synchronization process described for third party content items that may also be stored on a user's client device 100, the content management system 110 only requires one version of the first party content item stored in the data store 118. The first party application server 128 may then access the updated copy in the data store 118 whenever the user requests it through the web application interface. In some embodiments, the content management system 110 may include additional client applications (separate or included in client application 102) that may have the ability to open first party content items outside of a web browser or while the client device 100 does not have access to network 106. In this case, the content management system 110 may synchronize the first party content items with the client device 100.

Figure 3A:
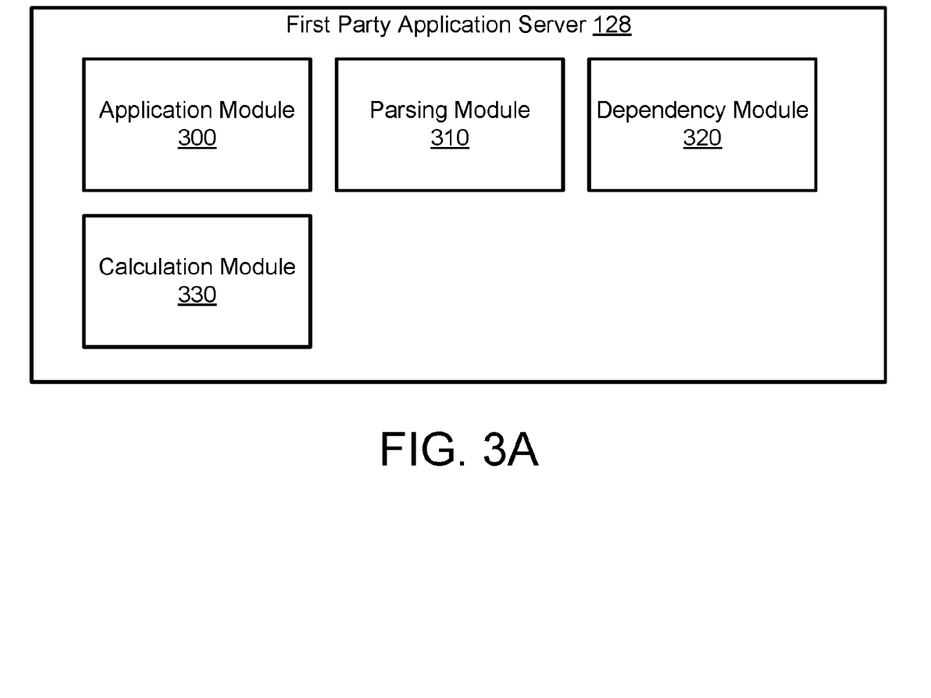
FIG. 3A illustrates a system architecture for a first party application provided by the content management system in accordance with one embodiment.

In addition to providing a web application interface and facilitating the creation of first party content items in the data store 118, the first party application server 128 may provide user interfaces for creating dependencies between first party content items and/or between a first party content item and a third party content item synchronized with the content management system 110. These user interfaces (UI) may be provided to a user of the first party web application by receiving input from the user to select a particular UI element indicating the creation of a dependency. Example implementations of a UI for creating dependencies are discussed in further detail with reference to FIG. 3.

The first party application server 128 may also monitor user text input to the provided web application in real time. When the provided web application receives input from a user corresponding to a key symbol the first party application server 128 may display UI elements to the user indicating that a dependency will be created based on further user input. The first party application server 128 then creates a dependency on the content management system 110 based on received further user input. This process is discussed in more detail in reference to FIG. 3.

The dependency server 124 communicates with the client application 102 installed on client device 100 regarding dependencies created or updated by the user while using a supported third party application. The dependency server 124 coordinates requests from the supported third party application via the client application 102. Once requests to access or modify either the dependency graph 126 and/or a third party graph 132 are received by the dependency server 124, the dependency server 124 edits or retrieves data from the dependency graph 126 and the third party graph of the third party application 132 and transmits the retrieved data back to the requesting client device 100. The processes facilitated by the dependency server 124 are further described with reference to FIG. 8.

Overview of the Dependency Graph

The dependency graph 126 is a database recording each dependency created in the content management system 110. The dependency graph 126 may be constructed using any type of database software. Various modules or servers of the content management system 110 may access the dependency graph and to retrieve and evaluate the formula of each object and thus determine an updated value to display in a first or third party application. Dependency objects are further addressed with reference to FIG. 4.

Figure 4:
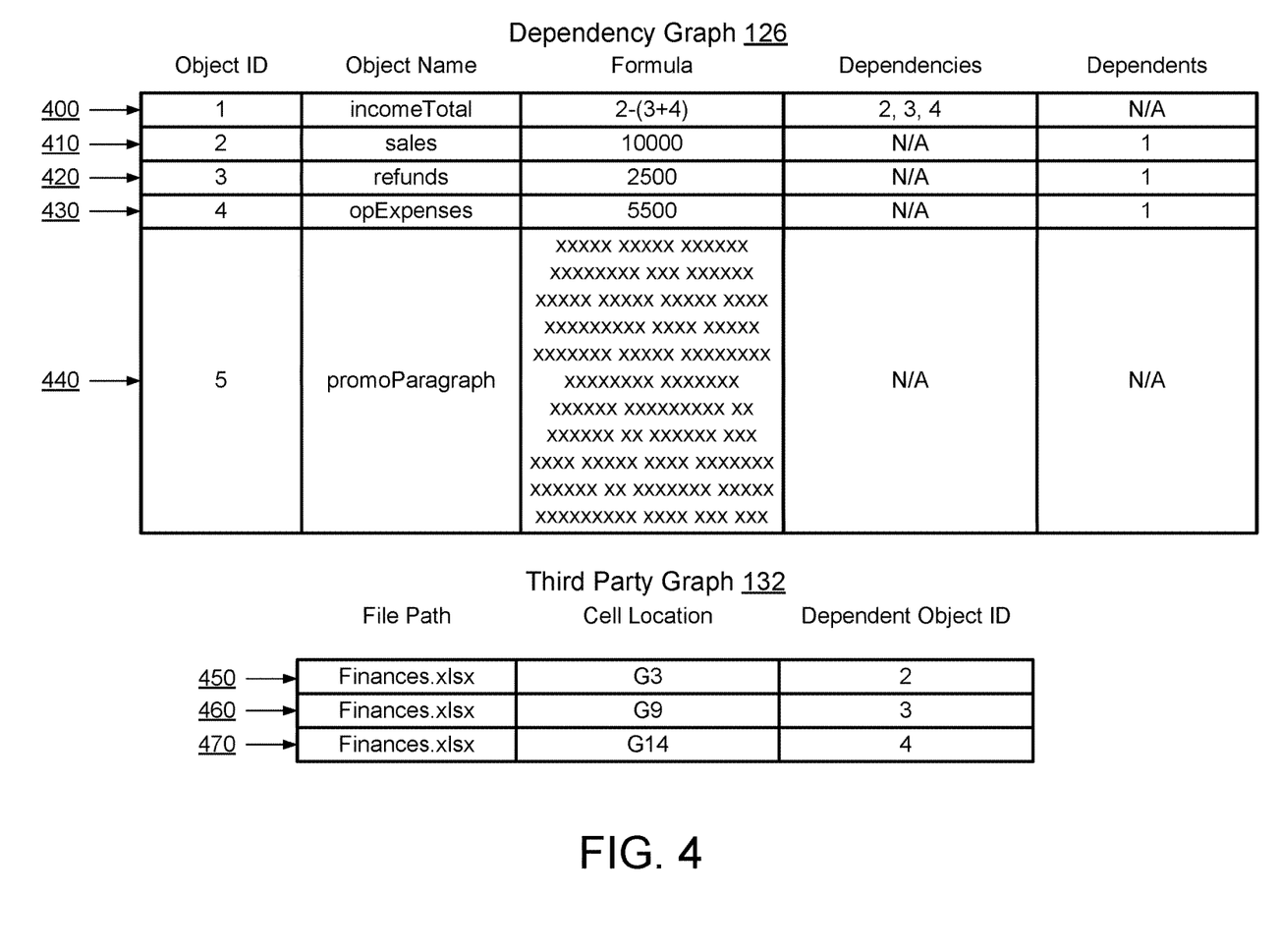
FIG. 4 illustrates a data structure for a dependency graph and a third party graph in accordance with one embodiment

FIG. 4 illustrates a data structure for a dependency graph and a third party graph in accordance with one embodiment. The dependency graph 126 is comprised of a plurality of database entries, each entry referred to herein as a "dependency object," or where convenient "object." Each dependency object is comprised of an object ID, an object name, a formula, dependencies, and dependents, examples of which are shown in FIG. 4.

Each dependency object created in the content management system 110 is given an independent object ID. The object ID may be generated by the dependency server 124 or the first party application server 128 using any suitable hashing algorithm. For ease of illustration, the object IDs shown in FIG. 4 are single digit numbers, however in practice the object ID may have any number of digits as long as the ID numbers can uniquely represent each dependency object in the dependency graph 126.

The object name of a dependency object is a string that is a user facing reference to the dependency object. If a user intends to insert a dependency into a content item, the user may select a particular dependency object by typing the object name of the dependency object preceded by proper syntax. Alternatively, a user may create a dependency without specifying a name. When this occurs, the first party application server 128 or the dependency server may create an anonymized name for the dependency object. The anonymized name is not shown to the user but kept for usage by the content management system 110.

The formula for the dependency object defines the dependency of the value of the dependency object (which may be calculated at runtime of an application, and thus not stored in the dependency graph 126) in terms of mathematical operation on references to other dependency objects. Formulas as represented in FIG. 4 may also simply be the value assigned to the dependency as is the case in rows 410, 420, 430, and 440. In the case of 440, the formula is simply a string of characters that the user has created as a dependency object. If a reference dependency is created with object 5 the full text in the formula column will be displayed in the application. In row 400, the formula is a mathematical operation involving the formulas of 3 other objects. The final result of the formula that is displayed in the application is referred to herein as a "resultant value" for a particular dependency object.

Dependencies for a dependency object are a list of object IDs that correspond to objects referenced in the formula. By appending the dependencies as a list without the operations in the formula, programs utilizing the dependency graph 126 can more easily recursively access objects in the dependency graph. For example, if a function were to solve for the value of object 1 it could immediately be called on the dependencies of object 1. If any of the dependencies had dependencies of their own then the program could again be called on those dependencies. When an object had no dependencies the function would return the value in the formula. Once this process was complete, a mathematical expression or other relationship between referenced objects could be calculated. For example, in FIG. 4 this process could be completed by calling the recursive function on object 1. Because object 1 has three dependencies the function would be called on each of objects 2, 3, and 4. Because objects 2, 3, and 4 have no dependencies the function would return their formulas. The function would then yield the formula 10000−(2500+5500).

Dependents are a list of object IDs that depend upon the value of a dependency object. Appending the dependents of a for a dependency object also allows for recursive traversal of the dependency graph 126 but in the opposite direction. This allows an application that is displaying multiple dependency objects to respond to changes in dependency objects appropriately. If a user makes an edit to a dependency object, the application will recursively reevaluate all dependents of the edited object. For example, if an application is displaying both object 2 and object 1 and a user changes the value of object 2 from 10000 to 12000, then the application will reevaluate object 1 adding 2000 to its resultant value.

Overview of Third Party Graphs

The content management system 110 has third party graphs 132 for each of the supported third party applications of the content management system 110. Each third party graph represents dependencies on specific locations in a third party content item that is synchronized with the content management system 110. Each object in the third party graph has a corresponding object in dependency graph 126 to which the specified value from the third party content item is pushed. Third party graphs are explained in further detail with reference to FIG. 4

FIG. 4 illustrates an example of a third party graph 132 for Microsoft Excel in accordance with one embodiment. This particular third party graph has three data columns including file path, cell location, and dependent object ID. The file path allows the third party live fill modules 130 to determine the location of the content item within the namespace of the content item. The cell location column refers to the particular cell in the excel file where the referenced data is located. The third party live fill module 130 uses this value to determine where in the Excel file to extract the referenced data from. The dependent object ID column indicates the object ID in the dependency graph 128 to which the referenced data should be uploaded. In the example of FIG. 4, objects 2, 3, and 4 all receive live updates according to rows 450, 460, and 470 of the Excel graph 132. Further detail regarding the operation of the third party live fill modules 130 is provided below.

Depending on the application associated with a third party graph 132, different columns may be included. For example, an Excel graph 132 may contain an additional column indicating which worksheet contains the referenced data. Depending on the structure of the data in the associated application, many more columns may be necessary to locate the data consistently. Despite variations in the number of columns, each third party graph 132 contains a column for the file path of the content item, at least one column specifying the location of the referenced data within the content item, and one column specifying the dependent object ID in the dependency graph 126. When a server (the first party application server 128 or the dependency server 124) creates a third party dependency the server creates a new object in the dependency graph 126 and the links a new object in the third party graph 132 to the newly created object in the dependency graph.

Each third party live fill module 130 on the content management system 110 continuously monitors the status of a corresponding third party graph 132 as well as the documents listed as dependencies in the third party graph 132. When a change to either the third party graph or one of the content items listed in the third party graph 132 occurs, the third party live fill module 130 accesses the appropriate third party content item and pushes the value at the specified location in the third party graph 130 to the dependency graph 126 according to the dependent object in the third party graph. The third party live fill module 130 for a particular third party application keeps the objects in the dependency graph 126 that rely on data from that third party application updated according to the entries in the third party graph 132 corresponding to the third party application.

Overview of Client Device

Each client device 100 is a computing device, such as a desktop, laptop, tablet, mobile device, or other system that maintains a local copy of shared data synchronized with content management system 110 and with other clients using the installed client application 102. The shared data may be synchronized only with clients associated with a single user, or may be synchronized to clients associated with multiple users. Client device 100 includes modules and applications for manipulating and adding data to the shared data, as further described with respect to FIG. 2.

Figure 2:
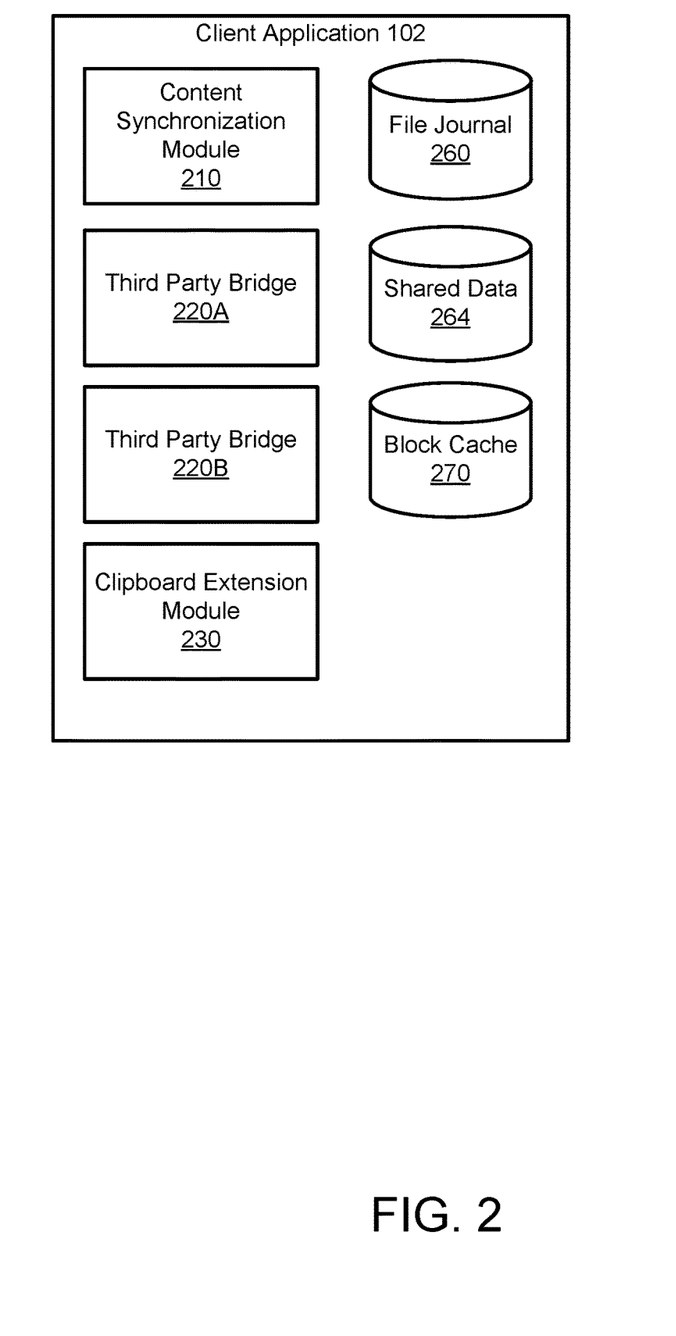
FIG. 2 illustrates a system architecture for a client application installed on a client device in accordance with one embodiment.

FIG. 2 shows modules of client application 102. Client application 102 includes various modules and data stores for synchronizing data with content management system 110. Client application 102 includes content synchronization module 210, third party bridges 220, and clipboard extension module 230. Additionally, the client application 102 maintains data stores including file journal 260, shared data 264, and block cache 270.

Shared data 264 are data that has been synchronized with content management system 110, and includes content items received from content management system 110. When users add, modify, or delete content items in shared data 264, those changes are synchronized with content management system 110. The content synchronization module 210 and the block cache 270 work to identify blocks that comprise content items being uploaded to content management system 110. content synchronization module 210 assigns a block identifier by performing any suitable hashing algorithm, such as MD5 or SHA-1. Content synchronization module 210 then uses these identifiers to compare the resident blocks located in the block cache 270 with the blocks maintained by content management system 110.

Within the client application 102, the file journal 260 stores a table listing metadata for all content items accessible to the account using the client application 102. Metadata includes revision date and time, namespace, and blocklists corresponding to each content item. Content items that are not resident or not synchronized are still included in the file journal 260.

When data is modified or added to the shared data 264 on the client device 100 within the client application 102, the modifications to the shared data 264 are transmitted to content management system 110 by content synchronization module 210. The uploaded data includes the relevant block identifier for the modified or added blocks. The content management module 110 then notifies other client devices that have the same namespace as the uploading client device 100 that new blocks, or new versions of blocks, have been uploaded. The notification may include the block identifiers and the corresponding content items to be updated. When the client device 100 receives a notification, client device 100 queries content management system 110 for modifications to shared data 264. When the shared data is modified, the content synchronization module 210 requests the modifications from content management system 110 to store shared data on client device 100. The request may be a single request that includes a block list for the new or updated content items or multiple requests may be sent each, including a single block for download to the client device 100. Content synchronization module 210 then receives any blocks downloaded from the content management system 110 by updating the file journal 260, shared data 264, and the block cache 270, to reflect the new versions of the downloaded blocks.

Figure 3B:
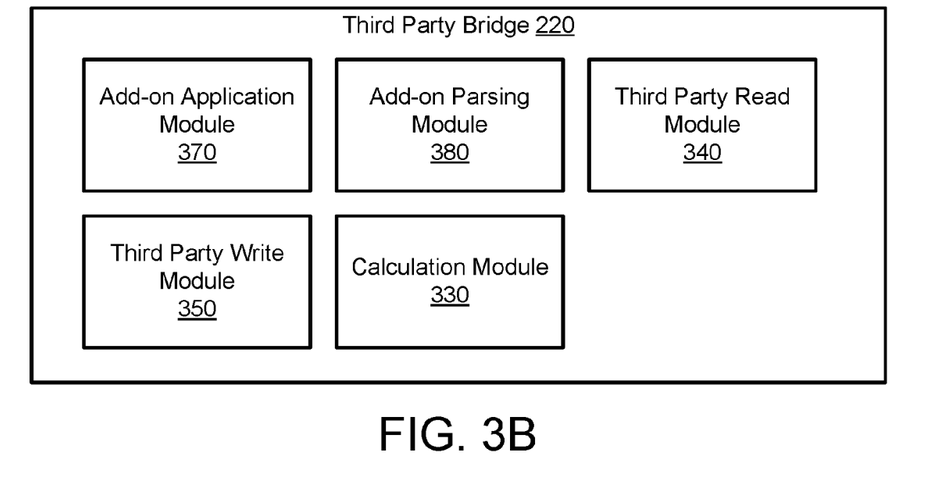
FIG. 3B illustrates a system architecture for a third party bridge provided by the client application in accordance with one embodiment.

Third party bridges 220 translate between the content management system 110 and the supported third party applications installed on client devices 100. The client application 102 may contain a third party bridge 220 for each supported third party application on the client device 100. Third party bridges 220 are configured to communicate with the dependency server 124 in real time to provide synchronized data on the value of dependencies included in third party content items. A third party bridge 220 provides the functionality of creating dependencies between content items to third party content items 220 that would otherwise not have that capability. A third party bridge 220 may be an add-on to the original third party application that provides additional functionality and user interface elements. A third party bridge also has the capability to perform read or write applications on third party content items in order to ensure that dependency data in the third party content item is synchronized with the data in the dependency graph 126. The third party bridge is further described with reference to FIG. 3.

The clipboard extension module 230 modifies the standard clipboard on the client device to provide additional functionality to the content management system 110. The clipboard extension module 230 allows metadata describing the location of copied data to be communicated to the application in which the data is eventually posted. The metadata contained in the clipboard may include whether the copied data is located in a synchronized content item and the location of the copied data in the synchronized content item that the data was copied from. When the user inputs a paste command in a third or first party application associated with the content management system 110 the application check the metadata in the clipboard to determine whether the copied data originated from a synchronized content item. If the copied data originated from a synchronized content item, the application provides a UI to the user for creating a dependency between the original location of the copied data and the pasted location of the copied data. The UI displays options for creating a dependency between the two points including an option to create an alias dependency between the two locations, an option to create a reference dependency between the two locations, or an option to paste normally. If the user chooses one of the first two options, the UI displays a second interface for specifying the dependency object. Once the user specifies the formula and, if the location of origin is in a third party document, the reference location for the dependency, the content management system 110 updates the dependency graph 126 and any third party graphs 132 if necessary.

First Party Application Server

FIG. 3A illustrates a system architecture for a first party application provided by the content management system in accordance with one embodiment. The first party application server 128 is comprised of a number of modules including application modules 300, parsing module 310, dependency module 320, and calculation module 330. The application module 300 of the first party application server 128 provides a first party web application in the browser of a user including the application user interface and the general functionality of that interface. For example, an application module 300 may contain the program code to implement a word processing application. In this case, the application module 300 would generate the UI of the word processing application in the web browser of a client device and respond to user inputs to input text into the word processing application as well as providing additional features typical of word processing applications in response to user input. Additionally, the application module 300 would coordinate the process of saving the word processing content items created in the word processing application in the data store 118 of the content management system 110. The first party application server 128 may have multiple application modules 300 each module corresponding to a different first party application. For example, an application module 300 may provide a word processing application, a spreadsheet application, and a presentation application. Additionally, an application module 300 may operate multiple sessions of the application at the same time thereby serving all user of the content management system 110.

The parsing module 310 monitors and parses input text in the first party application to determine whether the dependency primitive is present in the text. In some embodiments, the dependency primitive is an equal sign, "=." When the parsing module 310 determines an instance of the dependency primitive the parsing module 310 applies syntax rules to determine the state of the dependency primitive. First the parsing module 310 determines whether the potential formulas are written in valid dependency syntax. An example of dependency syntax is shown in Table 1 below in accordance with one embodiment.

If the syntax is invalid, the parsing module 310 notifies the application module 300 to display a pop up UI indicating that the formula as currently presented is either incomplete or invalid. In some embodiments, the pop up UI may display an option for the user to indicate that the usage of the dependency primitive was not intended to create a dependency, in which case, the parsing module 310 ignores that instance of the dependency primitive. In some embodiments, the parsing module 310 may notify the dependency module 320 before the user provided formula is complete so that the dependency module 320 can search for dependency objects that begin with the incomplete strings found in the incomplete formula provided by the user. If the dependency module 320 locates possible matches, the application module 300 may display a UI which presents autocomplete options to the user.

While the syntax is invalid the parsing module 310 monitors the formula to determine when it becomes valid. When the user edits the formula to make it valid, the parsing module 310 notifies the application module 300 to display a UI indication that the formula is valid. If the user indicates that the formula is complete (by interacting with the UI indication or pressing a key like the enter key, spacebar, or the like), the parsing module 310 notifies the dependency module 320 and the calculation module 330 to compile the formula.

The compilation of a dependency formula is described with reference to the dependency module 320 and the calculation module 330. After the formula is compiled, the resultant value is displayed in the first party application instead of the original dependency formula. The dependency ID is stored as metadata relating to the resultant value in the first party application. In some embodiments, the application module 300 displays the formula of a dependency object in a pop up UI when a user of the first party application hovers over the resultant value for the dependency object in the first party application. In response to a user interacting with the formula pop-up, the application module 300 may replace the resultant value with the original formula for the dependency object. When this occurs, the parsing module 310 determines whether the user has edited the formula. If so, the formula is recompiled.

Before the discussion of the dependency module 320 and calculation module 330 Table 1 provides an example of syntax for creating dependency objects in the content management system 110. Examples may be taken from FIG. 4.

| Syntax | Example | Description | Compilation Result | Resultant Value |
|---|---|---|---|---|
| = | = | Signals the beginning of a new dependency formula. | Parsing module 310 identifies that the formula is incomplete but monitors for a completed formula | N/A |
| =[existing object name] | =incomeTotal | Creates a reference dependency to an existing dependency object | Parsing module 310 identifies that the syntax is valid. Dependency module 320 returns the formula for the referenced object. | Calculated value of the referenced formula. (2000) |
| =[static value] [mathematic operation] [static value]... | =1 + 2 * 7 Or =mean(3, 7, 3, 5, 6) | Calculates a mathematical expression | A new dependency object is created with an anonymized name and the formula equal to the mathematical expression | Result of the mathematical operation. (15) |
| =[existing object name] [mathematic operation] [static or reference value] | =incomeTotal * 1.08 | Creates a new dependency object and returns the calculation | A new dependency object is created with an anonymized name having dependencies on the existing object included in the formula | Result of existing object and the operation. (2160) |
| [new object name] = [static value or calculation] | returnRate = 1.08 | Creates new dependency object and returns the static value or calculation | A new dependency object is created with the new object name having the formula | Result of static value or calculation |
| [new object name] = [existing object name] | alias = totalIncome | Creates an alias dependency with an existing dependency object | No new objects are created changes to one definition are synchronized with the original | Value of the original object. (2000) |
| [new object name] = | expIncome = totalIncome * 1.08 | Creates a new reference | A new object is created with the | Value of the existing object |

-continued

| Syntax | Example | Description | Compilation Result | Resultant Value |
|---|---|---|---|---|
| [existing object] [mathematical operation] | | dependency | existing object as a dependency | with the operation (2160) |
| [new object name] = [third party tag] | expIncome = .xlsx | Creates a new reference dependency with a third party content item | A UI is displayed for the user to select a location a third party document. A new object is created in the dependency graph and a new entry is created in the third party graph. | Value of the chosen location in the third party document |

After receiving a notification from the parsing module 310 to compile dependency formulas, the dependency module 320 determines whether strings in the dependency syntax are previously defined dependency objects or if they are new objects. The dependency module 320 extracts strings from the formula identified by the parsing module 310 and notes their location with respect to the dependency primitive. The dependency module 320 may use a variety of known database searching algorithms to determine whether each of the extracted strings is already present in the dependency graph 126. For each of the identified strings that are already present in the database the dependency module 320 uses a recursive algorithm to determine the value of the corresponding dependency object. If a string is not present in the dependency graph 126 the dependency module 320 checks the position of the novel string in the formula provided by the user. If the location of the novel string corresponds to syntax requiring the creation of a new dependency object, the dependency module 320 creates a new entry in the dependency graph 126. Typically, this location is immediately before the dependency primitive as shown in Table 1. Alternatively, a separate symbol may be used to identify that the user intends to create a new dependency object to facilitate easier parsing (by having all relevant characters appear after the dependency primitive). The dependency module 320 determines whether the dependency object to be created is a reference dependency or an alias dependency, depending on the syntax (see Table 1 for examples of how these might differ).

If, on the other hand, the string cannot be found as a dependency ID and is not in a location that would correspond to creating a new dependency object the dependency module 320 notifies the application module 300 that the referenced object does not exist in the dependency graph. The application module 300, in this case, may display UI elements communicating the status of the problematic string to the user.

In addition to compiling formulas provided by the user, the dependency module 320 also handles copy and paste triggered dependencies. Upon receiving a command from the user to paste data from the clipboard, the application module 300 analyzes the data from the clipboard to determine whether the data was copied from another synchronized content item. If so, the application module 300 displays a UI to the user requesting input as to whether the user wants to create a reference dependency, an alias dependency, or no dependency between the copied data and the pasted data. Depending on the option chosen by the user, the dependency module 320 will create the appropriate dependency between the two data locations.

The dependency module 320 may also allow the first party application server 128 to monitor the dependency graph 126 for any changes to the dependency objects present in the current first party content item. The dependency module 320 may maintain a list of dependency objects referenced in the first party content item. The dependency module 320 may monitor each of the dependency objects in the list periodically to determine if changes have been made by another user on a separate client device 100. If changes are detected the resultant value of the changed dependency object is recalculated and an dependents of the changed object being displayed in the current session of the first party application are also recalculated. Recalculation of all dependency objects in a first party content item may also occur when the first party content item is opened by a user.

Once the dependency module 320 has determined the value of all referenced objects in the formula the calculation module 330 completes the mathematical operations on the values determined by the dependency module 320. The calculation module 330 has the capability to interpret typical mathematical operators including multiplication, division, addition, and subtraction. Additionally, the calculation module 330 may be configured to perform more advance mathematical operations. The calculation module 330 may also apply functions, for example, determining average, standard deviations for sets of data included in the formula provided by the user. Any suitable mathematical function or operation may be supported by the calculation module 330.

Once the calculation module 330 has determined the resultant value for the dependency object the calculation module 330 transmits the resultant value to the application module 300 to display in the UI instead of the formula provided by the user. Once the replacement is complete the application module 300 may represent the details of the dependency with metadata while only displaying the raw text of the resultant value. Metadata may be used to indicate that the raw text in a particular location is generated by a particular dependency object ID. Additionally, application metadata may be used to represent the formula for the dependency object FIG. 3B illustrates a system architecture for a third party bridge provided by the client application in accordance with one embodiment. The third party bridge 220, which has a similar structure as the first party application server 128 in some embodiments. In some embodiments, similar functionality to a first party application may be offered to third party applications running on client devices 100. In this case, many of the modules are analogous to the modules of the first party application server 128. However, in other embodiments, more limited functionality is offered to third party applications and as such the third party bridge 220 has fewer modules and provides less functionality to third party applications.

The third party bridge 220 may contain an add-on application module 370, an add-on parsing module 380, a third party read module 340, a third party write module 350, and a calculation module 330. A client application 102 may include more than one third party bridge 220 if the content management system 110 supports multiple third party applications. If this is the case each third party bridge 220 will have the same modular architecture but each of the modules that interface with the third party application will have different instructions to interface with the particular third party application that they serve.

The add-on application module 370 performs similar functions to those of the application module 300 but applied to a third party application. Instead of directly issuing commands to the application as would occur in the first party application, the add-on application module 370 overlays UI elements on to the third party application in order to allow the user to configure dependency objects. To interface with the dependency graph 126, the add-on application module 370 communicates with the dependency server 124 in the content management system 110. In some embodiments, the add-on application module 370 provides a UI element that initiates the creation of a third party dependency in the third party content item irrespective of the user inputting the dependency primitive. Upon the user selecting this UI element the add-on application module 370 may provide a highlighting tool for the user to select the appropriate data for the dependency object. The add-on application module 370 may then provide a text input field for the user to complete a formula specifying a dependency object based on the selected data in the third party content item.

The add-on parsing module 380 monitors user input to the third party application to determine whether a user is creating a dependency object. The add-on parsing module 380 may also interpret application data to determine what dependency formulas already exist in the content item of the third party application. In some embodiments, the add-on parsing module parses formulas defined by users in the input fields provided by the add-on application module 370. Otherwise, the formula parsing process is similar to the parsing process on first party application.

The third party read module 340 provides the third party bridge 220 with the ability to access the selected third party content item data. The third party read module 340 determines the location of the user selected data in the third party content item. The third party read module 340 then communicates the location of the data to the dependency server 124.

An embodiment that supports including dependency objects in third party content items updates the value of dependencies in a content item in addition to allowing the user to reference the selected parts of the content item data in dependency objects included in the first party application. In this case, the third party write module 350 contains instructions for writing to the content item to include metadata interpretable by the add-on application module 370. The metadata is compatible with the third party application and provides the third-party read module with a location and formula with which to query the content management system 110. These modules working together provide a framework to include dependencies in a third party application that would not normally support it.

Process Flow for Propagating Dependencies in a Content Management System

FIGS. 5-8 illustrate interactions between the various servers of the content management system 110 to accomplish tasks associated with propagating dependencies. In the following descriptions, servers and applications may be referred to as a whole while performing an action instead of referencing the module of the server or application that is performing the taste.

Figure 5:
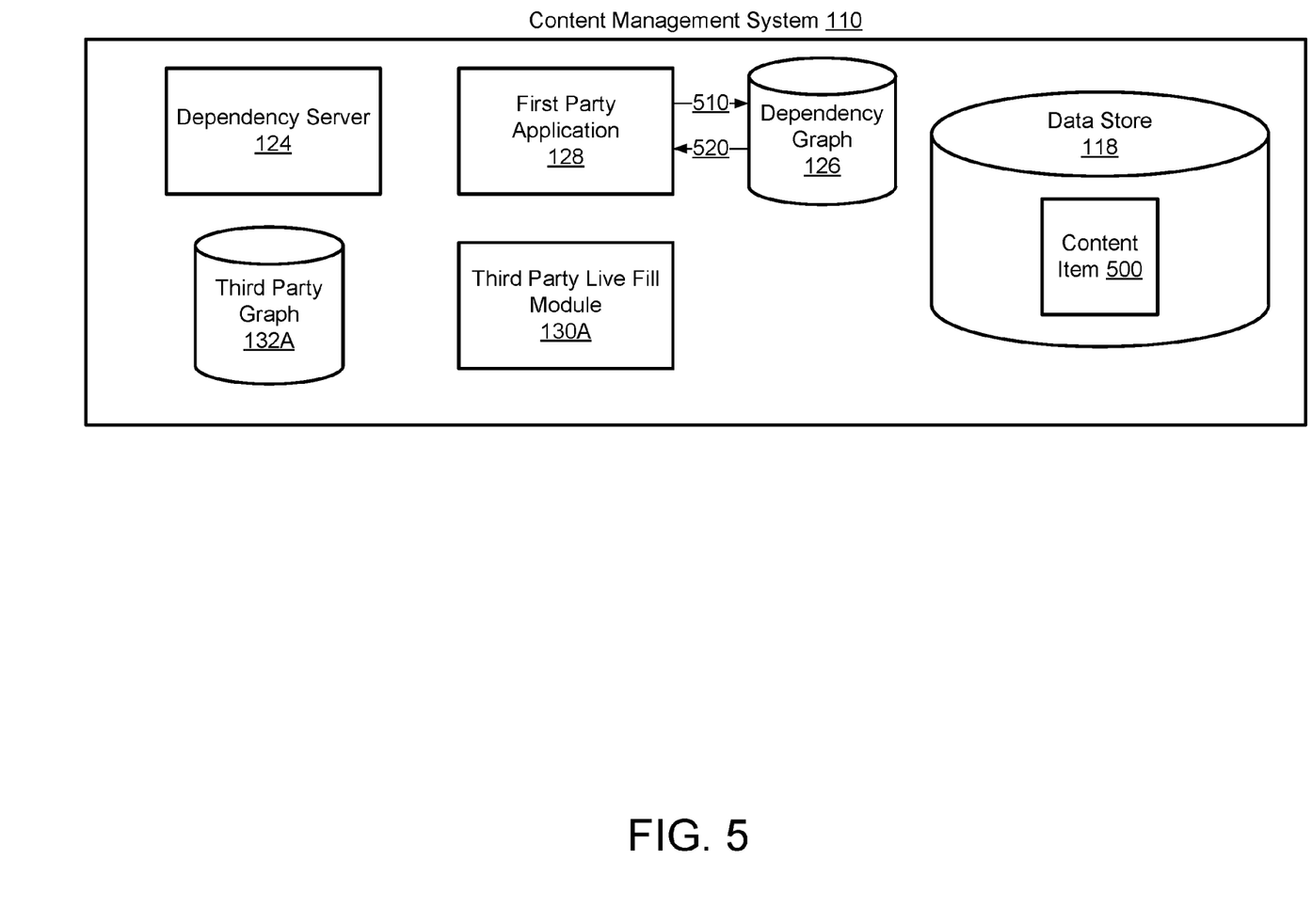
FIG. 5 is an interaction diagram illustrating a process of defining a dependency in a first party application in accordance with one embodiment.

FIG. 5 is an interaction diagram illustrating a process of defining a dependency in a first party application in accordance with one embodiment. FIG. 5 illustrates the first case wherein a user of a first party application defines a dependency object within the first party application according to the process described above with respect to the first party application server 128. On the server level the first party application server 128 accesses 510 the dependency graph 126 to create a new entry in the database corresponding to the new dependency object in the first party content item 500. Then the first party application server 128 recursively evaluates the dependencies in the formula of the newly created dependency object. Once all the dependent values are known the first party application server 128 uses its calculation module 330 to obtain a resultant value, which is then displayed by the first party application for first party content item 500.

Figure 6:
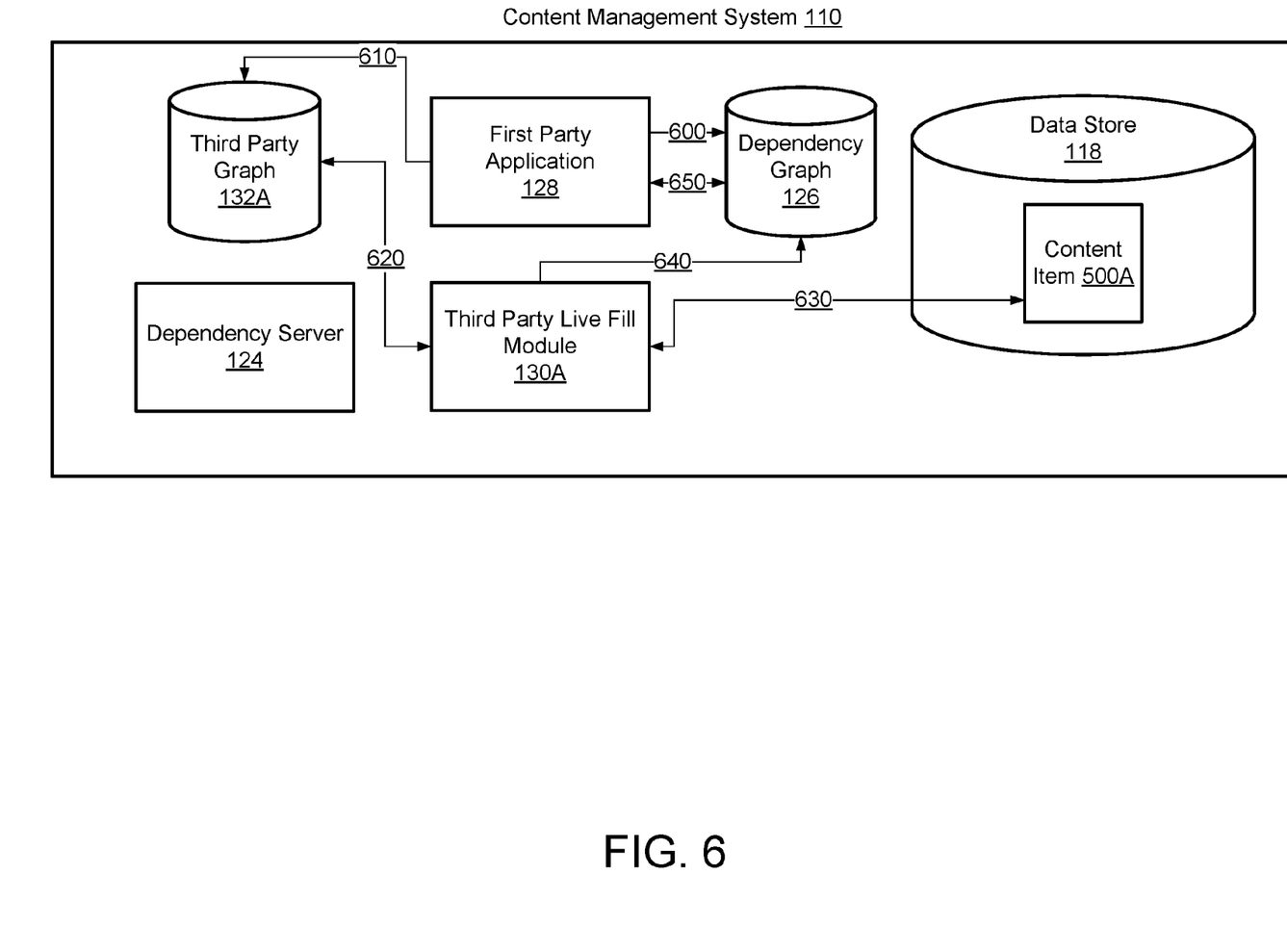
FIG. 6 is an interaction diagram illustrating a process of defining a dependency on a third party content item using a first party application in accordance with one embodiment.

FIG. 6 is an interaction diagram illustrating a process of defining a dependency on a third party content item using a first party application in accordance with one embodiment. The first party application server 128 receives an input from a user to create a dependency on data from a third party application. In some embodiments the first party application server 128 presents a UI to the user that allows the user to choose a third party content item from which to reference data. Upon receiving input from the user regarding the third party content item, the UI may display a preview of the third party content item allowing the user to specify the exact location of the data they would like to reference. The first party application server 128 then creates 600 an entry in the dependency graph 126. Then the first party application server creates 610 an entry in the third party graph 132A corresponding to the third party content item 500A to which the user desired to create a dependency and containing location information specified by the user. Third party live fill module 130A monitors 620 the third party graph 132A for changes. The third party live fill module 130A detects the creation 610 of the first party application server and proceeds to retrieve 630 the data from the content item 500A and location specified by the third party graph entry. In some embodiments, before retrieving the data from the third party content item 500A the third party live fill module 130A checks the metadata server 112 to determine if content item 500A is currently synchronized on the content management system 110. After retrieving the data 630 from the third party content item 500A, the third party life fill module 130A pushes the value of the retrieved data to the formula for the newly created dependency object on the dependency graph 126. The first party application server 128 may then access 650 the dependency graph to determine the resultant value for the dependency in the first party content item.

Figure 7:
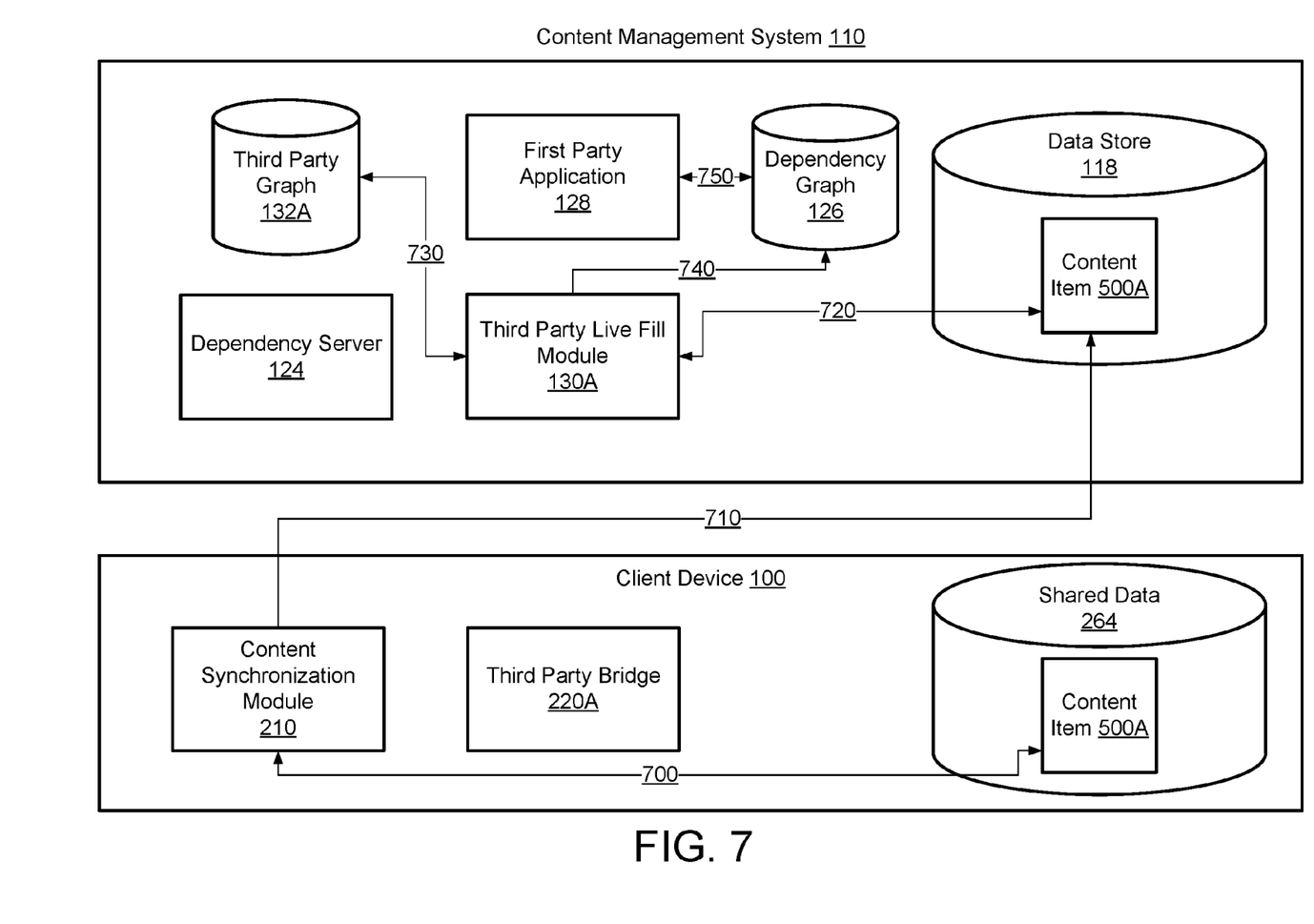
FIG. 7 is an interaction diagram illustrating a process of updating a dependency based on changes to a third party content item in accordance with one embodiment.

FIG. 7 is an interaction diagram illustrating a process of updating a dependency object based on modifications to a third party content item in accordance with one embodiment. In this case, a user on a client device 100 modifies a third party content item 500A. The content synchronization module 210 monitors 700 changes to the shared data 264 and thus begins synchronizing 510 the new version of the content item 500A with the content management system 110. The third party live fill module 130A monitors 720 the data store for changes and searches the third party graph 132A for dependencies on the modified content item 500A. If the third party live fill module 130A finds entries with a file path that matches a file path in at least one third party graph entry, the third party live fill module pushes 740 the data from the location specified in the third party graph entry to the dependency object specified by the third party graph entry. The first party application 128 then updates 750 the resultant value displayed in the first party content item.

Figure 8:
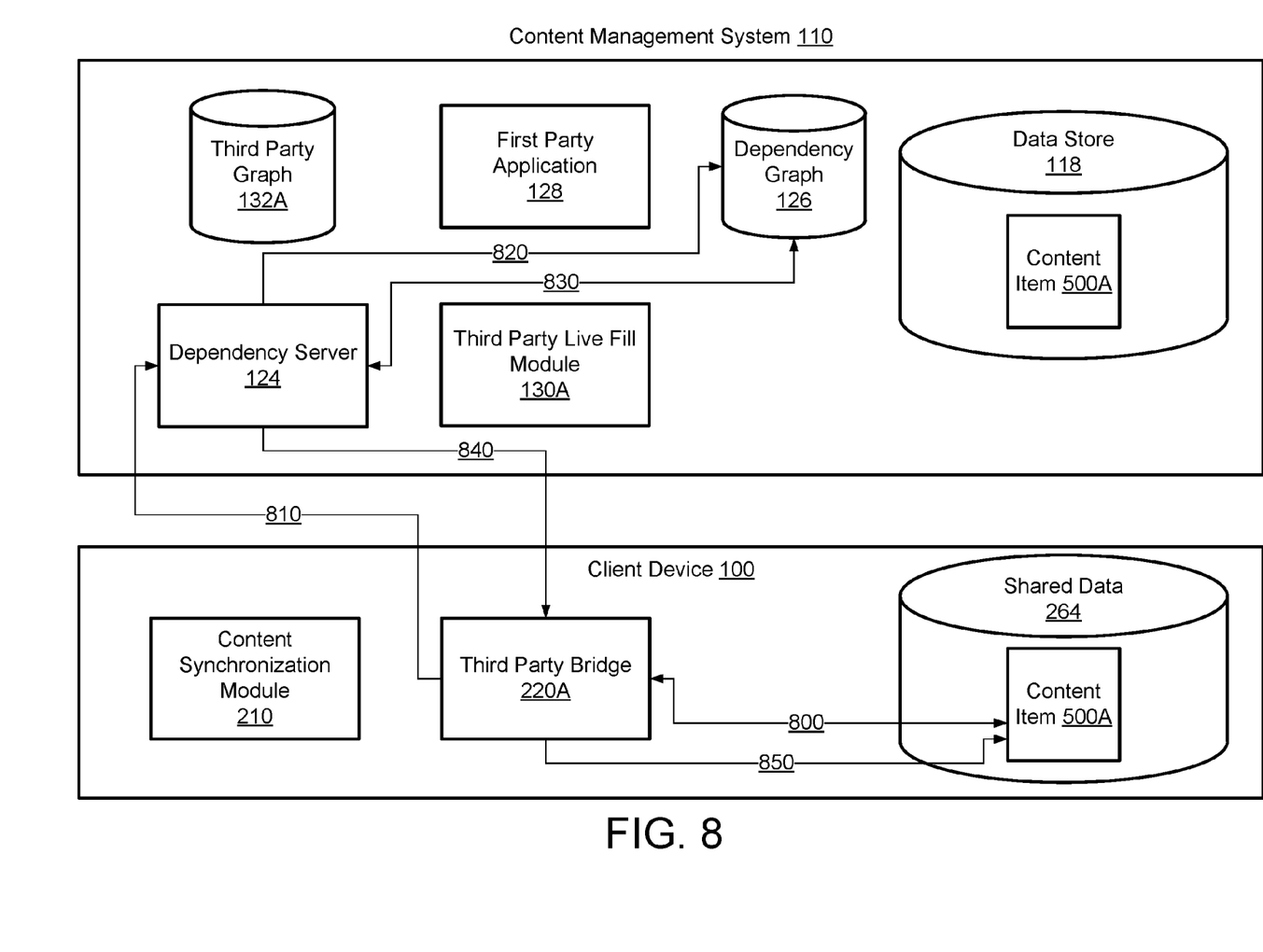
FIG. 8 is an interaction diagram illustrating a process of defining a dependency in a third party application in accordance with one embodiment.

FIG. 8 is an interaction diagram illustrating a process of defining a dependency in a third party application in accordance with one embodiment. A user editing third party content item 500A on the client device 100 inputs a command (via an add-on UI element or using the dependency primitive) to create a dependency on the content management system 110. The third party bridge 220A monitors 800 the user's inputs to the third party application and transmits the formula provided by the user to the dependency server 124. Dependency server 124 then creates 820 a dependency object in the dependency graph 126 according to the provided user formula. The dependency server 124 then recursively evaluates 830 the formula of the newly created dependency object based on other entries in the dependency graph 126. Upon obtaining an expression the dependency server 124 transmits 840 the expression to the third party bridge where the third party bridge 220A calculates the resultant value of the expression. The third party bridge 220A then edits the content item 500A according to the resultant value.

In some embodiments, the user may create a dependency on data located on a third party content item while editing a third party content item (of the same or different applications). If this is the case, after the dependency server 124 completes step 820 the dependency server 124 creates an entry in the appropriate third party graph 132 that corresponds with the third party application with which the dependency is to be created. Once an entry has been created in the third party graph 132 and the dependency graph, the third party live fill module 130A completes steps 620, 630, and 640 to update the dependency graph 126. After this update is complete the dependency server 124 may continue with steps 830, 840, and 850 to provide the appropriate resultant value to the third party application operating on client device 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing, by a content management system, a first party web application to a user;
receiving a first input from the user, the first input associated with a source document to be modified, identifying a reference document different than the source document, and including a dependency primitive associated with the source document and the reference document;
in response to receiving the first input, accessing a dependency formula associated with the dependency primitive via the first party web application;
determining, based on a set of syntax rules, whether the dependency primitive indicates a reference dependency or an alias dependency and whether the dependency formula is valid, wherein the set of syntax rules identifies the dependency primitive as a reference dependency in response to the dependency primitive including a mathematical operation, and wherein the set of syntax rules identifies the dependency primitive as an alias dependency otherwise such that a change to a first object in an alias dependency with a second object is reflected in the second object and vice versa;
responsive to determining that the dependency primitive indicates a reference dependency and the dependency formula is syntactically valid:
creating in a dependency graph a dependency object associated with the source document and the reference document, the dependency object having an object ID, an object name, a formula for the dependency object, dependencies of the object, and dependents of the object;
recursively calculating a resultant value of the dependency object using the formula for the dependency object and the value of all dependencies of the dependency object, the resultant value stored by the content management system; and
displaying by the first party web application the source document and the resultant value of the dependency object within the source document;
responsive to determining that the dependency primitive indicates an alias dependency and the dependency formula includes an existing dependency object name:
recursively calculating a resultant value of an existing dependency object corresponding to the existing dependency object name using the formula for the existing dependency object and the value of all dependencies of the existing dependency object without creating a new dependency object in the dependency graph, the resultant value stored by the content management system;
displaying by the first party web application the source document and the resultant value of the existing dependency object within the source document; and
synchronizing the displayed resultant value with the existing dependency object.

2. The method of claim 1 wherein creating a dependency object further comprises:
responsive to determining that the formula is syntactically valid and contains an indication from the user to obtain reference data from a third party content item:
displaying a UI to the user for selecting a file path of the third party content item in a namespace associated with the user;
receiving input from a user indicating the file path of the third party content item;
displaying a preview of the third party content item to the user for selecting a location within the preview corresponding to a location in the third party content item of the referenced data;

receiving input from a user indicating the location in the third party content item for the referenced data;

creating an entry in a third party graph, wherein the entry comprises the file path to a third party content item synchronized with the content management system, the location in the third party content item of the referenced data, and the object ID of the dependency object.

3. The method of claim 2 further comprising updating the formula of the dependency object based on the referenced data in the third party content item.

4. The method of claim 3 further comprising:
detecting modification to the third party content item;
synchronizing the third party content item with the content management system;
updating the dependency object based on the modification to the third party content item; and
updating the displayed resultant value of the dependency object based on the modification to the dependency object.

5. The method of claim 3 wherein the third party application is a spreadsheet application.

6. The method of claim 1 wherein the first party application is a word processing application.

7. The method of claim 1 wherein the formula of the dependency object is comprised of text data.

8. The method of claim 1 wherein creating a dependency object is in response to receiving an input from the user to paste data from a third party application to the first party application.

9. A system comprising:
a processor; and
a memory storing instructions that, when executed by the processor, cause the processor to:
providing, by a content management system, a first party web application to a user;
receiving a first input from the user, the first input associated with a source document to be modified, identifying a reference document different than the source document, and including a dependency primitive associated with the source document and the reference document;
in response to receiving the first input, accessing a dependency formula associated with the dependency primitive via the first party web application;
determining, based on a set of syntax rules, whether the dependency primitive indicates a reference dependency or an alias dependency and whether the dependency formula is valid, wherein the set of syntax rules identifies the dependency primitive as a reference dependency in response to the dependency primitive including a mathematical operation, and wherein the set of syntax rules identifies the dependency primitive as an alias dependency otherwise such that a change to a first object in an alias dependency with a second object is reflected in the second object and vice versa;
responsive to determining that the dependency primitive indicates a reference dependency and the dependency formula is syntactically valid:
creating in a dependency graph a dependency object associated with the source document and the reference document, the dependency object having an object ID, an object name, a formula for the dependency object, dependencies of the object, and dependents of the object;
recursively calculating a resultant value of the dependency object using the formula for the dependency object and the value of all dependencies of the dependency object, the resultant value stored by the content management system; and
displaying by the first party web application the source document and the resultant value of the dependency object within the source document;
responsive to determining that the dependency primitive indicates an alias dependency and the dependency formula includes an existing dependency object name:
recursively calculating a resultant value of an existing dependency object corresponding to the existing dependency object name using the formula for the existing dependency object and the value of all dependencies of the existing dependency object without creating a new dependency object in the dependency graph, the resultant value stored by the content management system;
displaying by the first party web application the source document and the resultant value of the existing dependency object within the source document; and
synchronizing the displayed resultant value with the existing dependency object.

10. The system of claim 9, the instructions further causing the processor to:
responsive to determining that the formula is syntactically valid and contains an indication from the user to obtain reference data from a third party content item:
display a UI to the user for selecting a file path of the third party content item in a namespace associated with the user;
receive input from a user indicating the file path of the third party content item;
display a preview of the third party content item to the user for selecting a location within the preview corresponding to a location in the third party content item of the referenced data;
receive input from a user indicating the location in the third party content item for the referenced data;
create an entry in a third party graph, wherein the entry comprises the file path to a third party content item synchronized with the content management system, the location in the third party content item of the referenced data, and the object ID of the dependency object.

11. The system of claim 10, the instructions further causing the processor to update the formula of the dependency object based on the referenced data in the third party content item.

12. The system of claim 11, the instructions further causing the processor to:
detect modification to the third party content item;
synchronize the third party content item with the content management system;
update the dependency object based on the modification to the third party content item; and
update the displayed resultant value of the dependency object based on the modification to the dependency object.

13. The system of claim 11 wherein the third party application is a spreadsheet application.

14. The system of claim 9 wherein the first party application is a word processing application.

15. The system of claim 9 wherein the formula of the dependency object is comprised of text data.

16. The method of claim 9 wherein creating a dependency object is in response to receiving an input from the user to paste data from the third party application to the first party application.

17. A non-transitory computer readable storage medium storing instructions that, when executed by a processor causes the processor to perform steps of:
 providing, by a content management system, a first party web application to a user;
 receiving a first input from the user, the first input associated with a source document to be modified, identifying a reference document different than the source document, and including a dependency primitive associated with the source document and the reference document;
 in response to receiving the first input, accessing a dependency formula associated with the dependency primitive via the first party web application;
 determining, based on a set of syntax rules, whether the dependency primitive indicates a reference dependency or an alias dependency and whether the dependency formula is valid, wherein the set of syntax rules identifies the dependency primitive as a reference dependency in response to the dependency primitive including a mathematical operation, and wherein the set of syntax rules identifies the dependency primitive as an alias dependency otherwise such that a change to a first object in an alias dependency with a second object is reflected in the second object and vice versa;
 responsive to determining that the dependency primitive indicates a reference dependency and the dependency formula is syntactically valid:
  creating in a dependency graph a dependency object associated with the source document and the reference document, the dependency object having an object ID, an object name, a formula for the dependency object, dependencies of the object, and dependents of the object;
  recursively calculating a resultant value of the dependency object using the formula for the dependency object and the value of all dependencies of the dependency object, the resultant value stored by the content management system; and
  displaying by the first party web application the source document and the resultant value of the dependency object within the source document;
 responsive to determining that the dependency primitive indicates an alias dependency and the dependency formula includes an existing dependency object name:
  recursively calculating a resultant value of an existing dependency object corresponding to the existing dependency object name using the formula for the existing dependency object and the value of all dependencies of the existing dependency object, the resultant value stored by the content management system;
  displaying by the first party web application the source document and the resultant value of the existing dependency object within the source document; and
  synchronizing the displayed resultant value with the existing dependency object.

18. The non-transitory computer readable storage medium of claim 17 wherein creating a dependency object further comprises:
 responsive to determining that the formula is syntactically valid and contains an indication from the user to obtain reference data from a third party content item:
  displaying a UI to the user for selecting a file path of the third party content item in a namespace associated with the user;
  receiving input from a user indicating the file path of the third party content item;
  displaying a preview of the third party content item to the user for selecting a location within the preview corresponding to a location in the third party content item of the referenced data;
  receiving input from a user indicating the location in the third party content item for the referenced data;
  creating an entry in a third party graph, wherein the entry comprises the file path to a third party content item synchronized with the content management system, the location in the third party content item of the referenced data, and the object ID of the dependency object.

19. The non-transitory computer readable storage medium of claim 18 further comprising updating the formula of the dependency object based on the referenced data in the third party content item.

20. The non-transitory computer readable storage medium of claim 19 further comprising:
 detecting modification to the third party content item;
 synchronizing the third party content item with the content management system;
 updating the dependency object based on the modification to the third party content item; and
 updating the displayed resultant value of the dependency object based on the modification to the dependency object.

* * * * *